June 11, 1957 J. RABINOW 2,795,705
OPTICAL COINCIDENCE DEVICES
Filed Aug. 26, 1952 3 Sheets-Sheet 1
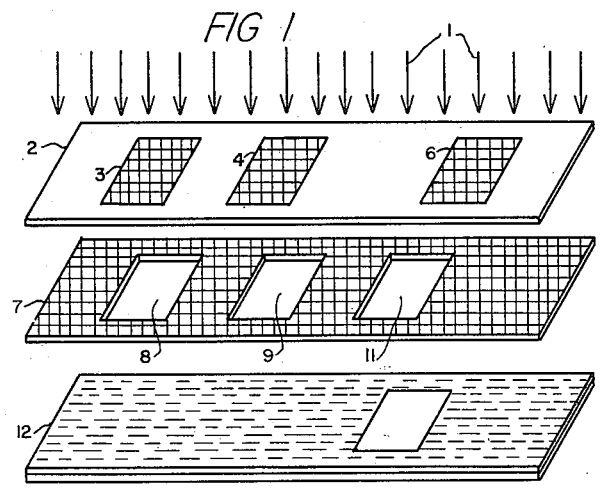
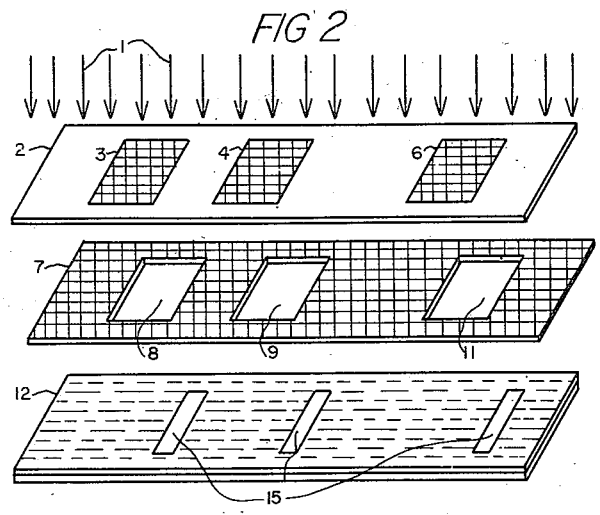
INVENTOR
JACOB RABINOW
BY *Howard L. Rose*
AGENT June 11, 1957
J. RABINOW
2,795,705
OPTICAL COINCIDENCE DEVICES
Filed Aug. 26, 1952
3 Sheets-Sheet 2
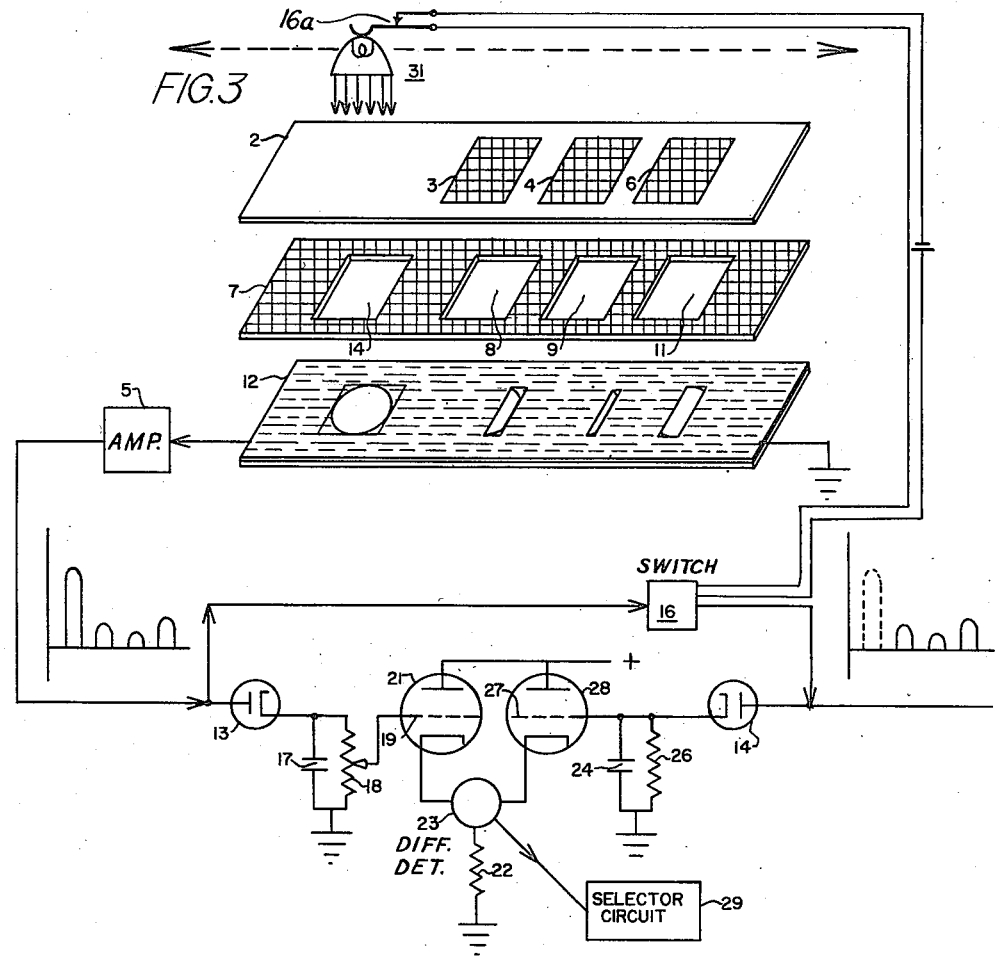
INVENTOR
JACOB RABINOW
BY Howard L. Rose
AGENT June 11, 1957   J. RABINOW   2,795,705
OPTICAL COINCIDENCE DEVICES
Filed Aug. 26, 1952   3 Sheets-Sheet 3
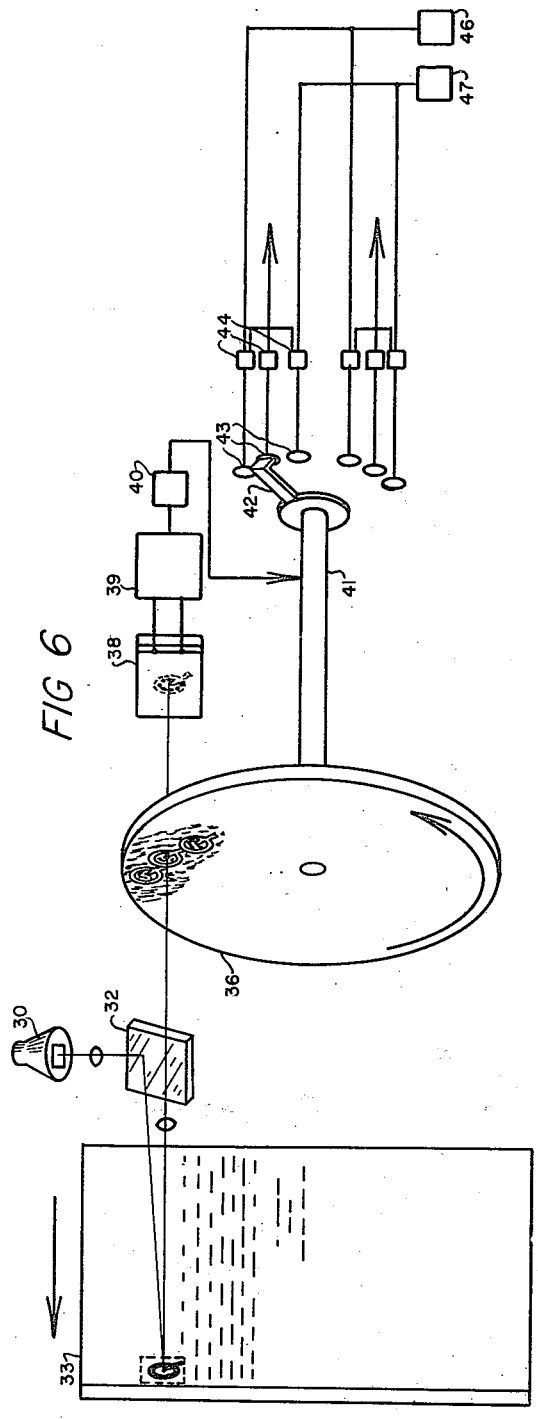
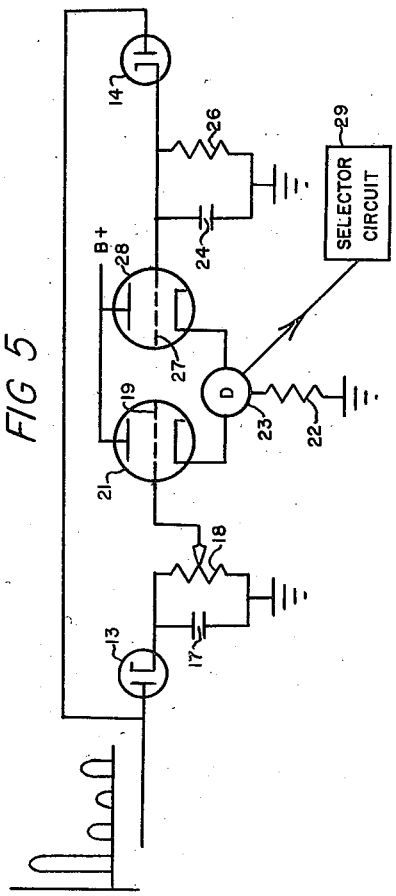
INVENTOR
JACOB RABINOW
BY Howard L. Rose
AGENT United States Patent Office 2,795,705
Patented June 11, 1957

2,795,705
OPTICAL COINCIDENCE DEVICES

Jacob Rabinow, Takoma Park, Md., assignor to the United States of America as represented by the Secretary of Commerce Application August 26, 1952, Serial No. 306,518

14 Claims. (Cl. 250—219)

(Granted under Title 35, U. S. Code (1952), sec. 266)

The invention described herein may be manufactured and used by or for the Government of the United States for governmental purposes without the payment to me of any royalty thereon in accordance with the provisions of the act of March 3, 1883, as amended (45 Stat. 467; 35 U. S. C. 45).

The present invention relates to the art of identifying recorded information so that specific items can be located quickly and accurately, and specifically relates to an optical system employing a flying spot scanner.

The voluminous files of modern industrial and governmental organizations have led to the use of microfilm and punched-card records. The day-to-day handling of such records necessitates the use of some automatic system for quickly and accurately locating specific items of information in the mass of items stored. Several systems have been suggested for the automatic identification of information stored on microfilm or punched cards of which the optical systems are of interest here. A number of optical systems have been proposed but all of them have certain inherent limitations. In one system in current use a transparent film, called an information carrier, carries photographs of certain documents, each of which is accompanied by a given code designation that appears as opaque markings on the film. Light is passed through the film and is projected onto an opaque mask, called an identification mask, which has upon it transparent code designations which indicate the particular information being sought. A photocell is located behind the mask and when light impinges upon the photocell the system is held in the unactuated condition. If a perfect match is obtained between the carrier and the mask, no light will pass through the mask and therefore no light will reach the photocell. This absence of light is made use of since it indicates coincidence. However, if there is a slight misalignment of the carrier and the mask, some light will reach the photocell even though there is actually a match between the two. If a large number of code locations are used, the amount of light reaching the cell due to misalignment may approach the amount of light reaching the cell due to an actual mismatch. As a result the system will indicate a mismatch when there is actually a match. Another difficulty with this system is that if the opaque markings on the carrier are not completely opaque, some light may pass through these markings and cause the system to indicate a mismatch when a match exists.

It is the primary object of this invention to eliminate difficulties encountered when the information carrier and the identification mask in an optical matching system are not in perfect alignment.

It is another object of this invention to eliminate the difficulties encountered when the information indications on the information carrier are not completely opaque.

Another object of this invention is to provide a flying spot scanner which throws light on small adjacent areas of the information indications in succession.

In accordance with one embodiment of this invention the stored information is carried on a transparent film or cards as a series of opaque indications. The information which it is desired to locate is carried on an opaque mask in the form of transparent indications. A flying spot scanner throws light upon the film or card and the passage of light through the system is observed by a photocell. In the most elementary form of this system, the flying spot provides light at only one indication at a time; that is, it does not shine light on the entire information area simultaneously but provides light at each indication sequentially. As a result, the amount of light observed by the photocell at any given instant will be indicated by the condition at a single location only. Therefore, when there is a match but a slight misalignment of the two records, the amount of light reaching the photocell will be very small, since there will be no cumulative effect due to misalignment of all of the information areas. The amount of light at any given instant is compared with the amount of light that would be obtained if there were actually a mismatch. Therefore, since the amount of light obtained due to a misalignment at a single information area will be small compared with the amount of light due to a mismatch, the system can readily detect the difference between the two.

Other uses and advantages of the invention will become apparent upon reference to the specification and drawings.

Figure 1 is a diagrammatic representation of a prior art system showing a mismatch between a card and an identification mask.

Figure 2 is a diagrammatic representation of a system of the prior art in which there is a match between the two elements.

Figure 3 is a schematic diagram of one embodiment of the present invention.

Figure 4 is a diagrammatic representation of another embodiment of the invention.

Figure 5 is a circuit diagram of a comparator circuit which may be used with the embodiment of the invention shown in Figure 4.

Figure 6 is a schematic diagram of the flying spot scanner being employed in a print-reading system.

In Figure 1, which is a diagrammatic representation of a data-searching system according to the prior art, parallel beams of light 1 are directed onto an information carrier 2, which is a transparent film or card having opaque indications 3, 4, and 6. Located directly below the information carrier is an identification mask 7 which is made up of an opaque card, or film, having upon it transparent indications 8, 9, and 11. Located directly below the identification mask 7 is a photoelectric element 12. The parallel rays of light 1 are directed upon the system so that if they are not completely blocked by the cards 2 and 7, the light will reach the photoelectric element 12. In this figure the information indications on the information carrier 2 are not identical with those on the mask 7 in that, although areas 3 and 4 correspond with areas 8 and 9, the area 6 does not correspond with the area 11. Since no light can pass through areas 3 and 4 of card 2, and no light can pass through the mask 7 except at areas 8 and 9 which can receive no light because of the opaque markings 3 and 4, no light can reach the element 12 from this region. However, since there is no opaque marking on the information carrier 2 corresponding to the transparent marking 11 on the mask 7, light will pass through the location 11 and impinge upon the surface 12. This will indicate a mismatch between the carrier and the mask and the system will not extract the information on that particular information carrier.

Referring to Figure 2 in which the elements carry the same numbers as the corresponding elements in Figure 1, there is shown a condition in which a perfect match has been obtained. Theoretically, in this condition no light should reach the photoelectric element 12. However, if there is a slight misalignment of the information carrier 2 and the mask 7, the opaque areas 3, 4, and 6 will not completely cover the transparent areas 8, 9, and 11, and some light will reach the photoelectric element 12. These areas are shown on the surface 12 as the light areas 15. Where large numbers of information indications are used this misalignment may cause the system to indicate a mismatch when there is actually a match between the two. Assume, for example, in a system employing 50-information indications there is a 2 percent misalignment between the two elements. As a result as much light will now reach the photoelectric element as if there had been a mismatch betwen the elements in one of the information indications. This, of course, will cause the system to indicate a mismatch when there is actually a match. In systems, as employed today, where it is desired to have operations at very high speeds, obtaining a perfect alignment between the information carrier and mask requires the use of very accurate mechanisms, which even then cannot insure a perfect register all of the time.

In the prior art an attempt was made to solve this problem by making the information indications on the information carrier larger than the corresponding transparent areas on the identification mask. This allows for a slight misalignment between the two before light is passed around the edges of the coded areas. Although this solution reduces the chances for error to some extent, it does so at the expense of available space for carrying information.

Although misalignment of the carrier and mask is perhaps the major cause of errors in this system, another source of errors arises from the fact that the opaque indications on the information carrier are not always completely opaque and will as a result allow some light to reach the photoelectric surface. Here again a 2 percent variation in film blackness in a 50-location system gives approximately the same light as a one-location mismatch. Thus, it is impossible to distinguish between an actual match of gray film as opposed to a one-location mismatch of black film. In the prior art, this difficulty was overcome, as was that because of misalignment, by employing one photocell for each location or for a small group of locations. Although this solution allowed for some variation in these two parameters, the tremendous increase in circuit complexity more than offset the advantages gained.

Another difficulty experienced in the prior art is that the "extinction" level of current produced by the photosensitive surface does not stay constant. The amount of light that reaches the photosensitive surface is determined not alone by the opacity and match of the two indication-bearing materials. If the sheets are separated by some appreciable distance, or if, as is usually the case, a lens system is used to project the image upon the card, then stray light begins to give trouble. In the case of optical projectors this stray light may limit the number of dots to as small a figure as ten for each photocell. Another difficulty is that the gain of the amplifiers, which normally follows this pick-up device, does not stay constant over long periods of time.

Figure 3 shows one embodiment of the invention which will eliminate the difficulties cited above. In this system the identification mask, information carrier, and photoelectric element are identical with those shown in Figures 1 and 2 and carry the same reference numerals. The voltage output from the photoelectric element is fed through a suitable amplifier 5 to the plate of the diode 13 and to the plate of the diode 14 through an electric switch 16. The cathode of the diode 13 is connected to ground through the parallel combination of the condenser 17 and resistor 18. The grid 19 of the tube 21 is connected to a variable tap on the resistor 18. The cathode of the tube 21 is connected to the resistor 22 through part of the detector network 23. The cathode of the diode 14 is connected to ground through the parallel combination of the condenser 24 and resistor 26 and also to the grid 27 of the tube 28. The cathode of the tube 28 is connected through a part of the detector network 23 to the resistor 22. The other end of the resistor is grounded. The plates of the tubes 21 and 28 are connected to a B+ supply. This circuit operating in conjunction with the flying spot 31 provides one means for eliminating the difficulties encountered in the prior art. The flying spot symbolized by the light source 31 in Fig. 3 may be in the form of any well known optical scanning means such as is commonly employed in the information-sensing art. For example, inasmuch as it is only necessary to obtain relative motion between the light source 31 and record medium, the members 2 and 7 can be displaced relative to the light source in the manner disclosed in the Bryce Patent No. 2,124,906. Alternately rotating drum scanning devices as well as cathode ray tube scanners, as shown in the Patent No. 2,402,058 to Loughren, which are well known in the art, may be employed. The particular scanning means employed does not form a significant part of the present invention. The system that is used for scanning is different from that shown in Figures 1 and 2 in that a flying spot of light moves at a very rapid rate back and forth in a direction parallel to the major axis of the information carrier and mask. The source of light is designed so that it will throw light on only one indication, or at most a small number of information indications, at a time rather than over the entire area of the card as was done in the system shown in Figures 1 and 2. In the present system, however, an extra indication 14 is always added to the identification mask but is not added to the information carrier. Therefore light from the scanner, when it is over indication 14 will pass through both the information carrier and the mask at all times and give a full pulse of light which normally would indicate a mismatch. The operation of this system depends upon the comparison of the amount of light normally produced by this one-indication "mismatch" with the light produced on the photoelectric element by the flying spot of light as it moves over each of the other locations.

Before the information carrier 2 is brought into register above the identification mask 7, the flying spot is caused to pass back and forth over the mask 7. This will cause several large voltage pulses to be applied through the diode 13 to the condenser 17, thereby charging the condenser 17. The switch 16, which may comprise a normally closed relay, is synchronized with the displacement of the flying spot scanner 31 so as to be deenergized when the scanner is over the light-transmitting area 14. The switch may comprise any optional arrangement employing a pair of normally closed contacts such as the contacts of a relay, the coil of which is included in a circuit which is energized when the scanner closes a switch 16a spatially positioned in the path of the scanner at a position above the light passage 14. Pulses corresponding to apertures 8, 9, and 11, will therefore be applied through the switch 16 and diode 14 to the condenser 24, causing it to charge to peak voltage. In this manner a series of equal-amplitude pulses corresponding to the calibration indication 14 and the transparent areas 8, 9, and 11 on the mask will be sequentially generated by the scanning action of the spot 31 and applied in like time sequence to the plate of diode 13 and pulses of the same amplitude but corresponding only to the areas 8, 9, and 11 will be applied to the plate of diode 14. Since grid 19 of the tube 21 receives a smaller proportion of the voltage across the condenser 17 due to the voltage divider 18 than the grid 27 receives from the condenser 24, the tube 28 will conduct more current than tube 21. Thus the flip-flop circuit 21—28 will be initially triggered so that the righthand side 28 is conducting. When information carrier 2 is then brought into register above the card 7 the flying spot will first strike location 14, causing a pulse to be applied to condenser 17 regardless of the information areas on the carrier. This pulse will not reach condenser 24 because the switch 16 is kept open when the light source is over the location 14. Any number of means may be provided for producing this synchronism between the flying spot and the switch 16. The reason for preventing this pulse from reaching the condenser 24 will be explained subsequently. As the flying spot moves across the rest of the information carrier no voltage pulses will be applied to either condenser 17 or condenser 24, since the system shown in the figure indicates that there is a match. However, if some light does impinge upon the photoelectric element 12 because of misalignment of the information carrier and mask or because the locations 3, 4, and 6 are not completely opaque, these pulses will be fed to the plates of both diodes 13 and 14, the switch 16 having been closed by this time by the displacement of the flying spot as described. The pulses fed to the diodes are shown directly above the leads to the plate of each diode. During such scan the large amplitude pulse generated at aperture 14 will appear only at the plate of diode 13. Since these voltage pulses will be of lower amplitude than the original pulses produced before the information carrier was brought into register, the condenser 24 will begin to discharge but the condenser 17 will be charged by the referred-to initial pulse corresponding to aperture 14. The spot is caused to move back and forth across the carrier and mask several times, and each time the spot moves over location 14 the condenser 17 will be recharged to the peak voltage by the referred-to pulse, but the condenser 24 will continue to lose its charge, while the condenser 17 will be maintained at approximately peak voltage. The time constant of the condenser 24-resistor 26 network should be chosen so that just as the scanning is completed the condenser 24 will have discharged to a point where the bias on the grid 27 will be smaller than the bias on the grid 19. When this occurs the tube 21 will begin to conduct more current than tube 28, and because of the cumulative effect produced by resistor 22 to indicate a match, the circuit will flip, causing tube 21 to pass a large current while tube 28 passes a small current. The detector network 23 will detect this flip and send an impulse to the selector circuit 29, which will then record the information that appears on the carrier 2 in some suitable manner. The detector 23 may be in the form of a conventional differential relay or other suitable recognition circuit such as is shown in Fig. 11.28, page 446 of "Vacuum Tube Amplifiers," Radiation Laboratory Series, vol. 21; Fig. 15.20, page 512 of "Electronic Instruments," Radiation Laboratory Series, vol. 4 (McGraw-Hill); or Fig. 620, page 113 of "Electron Tubes" by Seeley. By choosing the point at which this flipover will occur at a voltage on grid 27 of a magnitude less than that which indicates a mismatch but more than that which could possibly be received by the circuit as the result of misalignment during a match, the circuit can readily distinguish between these two conditions. Consequently this system will completely eliminate the confusion between misalignment and mismatch which causes so much trouble in the use of prior art devices. If a mismatch had existed between the information carrier 2 and mask 7, large pulses would have been fed to the condenser 24 during the scanning cycle and this would have maintained this condenser in its fully charged position. This then would have maintained the tube 28 fully conducting and would have prevented the circuit from flipping over. As a result the detector circuit would not pulse the selector circuit 29 and the information would not be extracted from the information carrier.

The tube 21 and its associated circuitry serves a very useful function in that it provides for a voltage reference level that varies with the operating conditions; that is, since the condenser 17 is being constantly recharged during the operation of the system, the reference voltage on grid 19 will vary with changes in line voltage, photocell characteristics, the amount of light leakage in the system, and aging of the circuit components. If a fixed reference voltage were used then, for example, as the photocell aged the voltage applied to the condenser 24 might never be large enough to cause tube 28 to conduct predominately.

The system has been described as using a multiple sweep over the information carrier 2. A single sweep may also be used, and in this case the time constant of the resistor 26 and condenser 24 network would be so chosen that the condenser discharge would occur sufficiently fast to cause flipover at the end of a single sweep.

It is possible, if so desired, to use more than one identification mask at a time; that is, two or more masks might be used together to give a third combination of indications.

Figure 4 shows an embodiment of the invention which may be used when a more extensive area is to be scanned. The operation of this embodiment will be described with reference to Figure 5 also, this figure being a circuit diagram of a comparison circuit which may be used with the type of scanner employed in Figure 4. It will be noted that Figure 5 is the same in all respects as the comparator circuit shown in Figure 3 except that the switch 16 has been eliminated and therefore both condensers receive all the pulses. While in the circuit of Figure 3 the time constant of condenser 17 and resistor 18 could be equal to that of condenser 24 and resistor 26 if multiple sweep were used, this cannot be done in the circuit of Figure 5. Here the time constant of the combination of condenser 17 and resistor 18 must be made much larger than that of the combination of condenser 24 and resistor 26. The reason for this will be obvious from what follows.

In Figure 4 the information indicators on the information carrier 2 are grouped in adjacent columns. Each column may correspond to a separate piece of information or several columns may be grouped together to make up the indications necessary for locating a single piece of information. The identification mask 7 carrying information in a single column will be situated with respect to the information carrier 2, the same as shown in Figure 3. Also an additional identification mask 10 carrying information in several columns may be used and is shown in this figure. The two masks may be used separately or simultaneously. In this embodiment the information carrier moves continuously from the right side of the drawing toward the left while the spot moves perpendicularly to the line of travel of the information carrier as indicated by the arrows 20. If the indications are in a single column, the flying spot will have only this motion, that is, perpendicular to the path of travel of the information carrier. However, if the indications are carried in several columns, as shown on the mask 10, the spot must move not only perpendicularly to the path of travel but must also move parallel to it, as shown by arrows 25, at a very rapid rate so that each column in the group will be scanned several times during a period in which the carrier 2 moves very little relative to the identification mask 7. More than one information carrier may be stacked above the identification mask as long as information indications on both do not appear above the mask at the same time.

The operation of the device is as follows: The sweep of the flying spot is started before the carrier 2 comes into register above the identification mask 7. This will cause numerous voltage pulses to be applied to the condensers 17 and 24 and, as explained before, the tube 28 will conduct more than tube 21. When the carrier 2 is in register above the identification mask 7 and the information to be identified is carried in a single column the spot will sweep that column several times while it is in register above the identification mask 7. If there is no match the voltage pulses produced by the voltage reaching the photocell will maintain both condensers in a fully charged condition and the circuit will indicate a mismatch. If there is a match, the condenser 24 will become discharged sufficiently after several sweeps to cause the circuit to flip over, indicating a match. Because of the large time constant, condenser 17 will still hold its charge.

When several columns carry the information to be identified, as shown by mask 10, the system will indicate a mismatch at all times until the columns on the carrier 2 are in complete register with the corresponding columns on mask 10. Therefore in this system there is no need for the extra indication on the mask, as was required in Figure 3, since the system will indicate a mismatch at all times except when these columns are in their correct position. Therefore even if two areas come up in a row which are matched with the mask 10, the system will indicate a mismatch while the first information area is moving past the mask and the second information area is moving into position above the mask.

As stated above, the flying spot must cover the entire area of information indications during a period when the carrier has had relatively little motion with respect to the mask. This can easily be accomplished by the use of a cathode-ray sweep which can be caused to sweep at a 10-megacycle rate or higher. Any mechanical drive means for the information carrier which is at present known would be virtually at a standstill compared with such a sweep rate.

Because this last system depends upon the difference in two RC time constants, this system cannot be used to read static cards as was done in the case of Figure 3. This is of little importance since all these systems are designed for high-speed reading of great amounts of data.

The matching of dots by the flying spot techniques give rise to other applications of this principle. For one thing it should be clearly understood that the flying spot of light can be used to cover more than one spot of information. If four spots are covered simultaneously the system will still recognize coincidence but the permissible errors in positioning, stray light, and opaqueness would have to be kept to smaller values.

If one considers a printed letter as nothing more than a group of elemental areas, then the flying spot coincidence principle can be applied to automatic reading of printed matter.

Figure 6 is a schematic diagram showing the application of the flying spot scanner to such reading of printed matter in which the identification means comprises informational data which is the negative image of the data on the information carrier. In this figure 30 is a cathode-ray tube which produces a flying spot of light which is directed onto the half-silvered mirror 32 and from the mirror onto a sheet of printed matter 33. The light striking the sheet is reflected from the white portions but not from the black. Since most printed matter is made up of black letters on a white background, an ordinary sheet of printed material will have the same effect on the spot as the information carrier 2 in Figure 3. The light reflected by the sheet 33 is passed through the half-silvered mirror 32 onto the rotating disk 36. The disk has positioned about its periphery all the letters of the alphabet and any numbers and characters which it may be desired to identify. Each character is represented on the periphery of the disk three times, each group of three being positioned along a helix; that is, each character is positioned at a slightly shorter radial distance from the center of the disk than the preceding character in that group. The reason for this will be explained subsequently. The representations of the different letters and numbers on the disk are transparent, while the rest of the disk is opaque. Light passing through the disk impinges upon the photoelectric element 38. The voltage output of the photoelectric cell is fed to the amplifier 39 and then to the comparator circuit 40, the output of which is connected to a brush on the shaft 41 of the rotating disk. Carried on the end of the shaft is another brush 42 which makes contact with the group of contacts 43. There is a group of three contacts 43 corresponding to each letter or numeral on the disk 36. The brush 42 touches the contacts 43 which correspond to the particular character on the disk 36 which is positioned to be scanned by the flying spot. The output from each of the contacts is fed into relays 44. The upper and lower relays of each group of relays 44 have two output, one output of each relay being connected to the output of the single output relay connected to the center contact 43. These outputs are fed to a printer which will print the letter or numeral which is positioned in front of the flying spot when there is an output from the amplifier 39. The second outputs of the upper relays of each group of relays 44 are all connected together and fed to a stepping mechanism 46, the purpose of which will be explained later. The second outputs of the lower relays of each group of relays 44 are connected to another stepping mechanism 47 and again all of the outputs of all of these relays are connected together. The operation is as follows: The sheet 33 is initially positioned with respect to the flying spot so that the upper left-hand letter or numeral on the sheet is the first to be scanned by the flying spot. The disk 36 is caused to rotate at a very high speed so that all of its characters will pass in front of the flying spot at least once while the beam is still scanning the first character on the sheet 33. The flying spot operates at a very high speed so that it sweeps each character several times while each character on the rotating disk is positioned to intercept the beam of light. A mismatch will be indicated by the system at all times until the character on the disk corresponding to the character on the sheet is positioned in front of the beam of light. At this time no light (or little light) will reach the photoelectric element 38 and the output from the amplifier 39 will be fed to the comparator 40. If there is an output from the comparator, it will be sent through the contacts 43 to the relays 44. The first output of the relays will cause the printer to print the corresponding character. The three characters in each group and three contacts of the corresponding three relays are used to keep the sheet positioned properly with respect to the disk. If the sheet is slightly high with respect to the disk the match in the system will occur when the highest character of the group of three on the disk is positioned in front of the beam of light. At this moment, that is when the highest character is in front of the beam of light, the brush 42 will touch the upper contact of the group of contacts 43. This will actuate the upper relay 44, the one output of which will be fed to the printer, the other output of which will be fed to the stepping relay 46 which will cause the sheet 33 to be moved down slightly so that the character on the sheet is now directly in front of the middle character of the group of three on the disk 36. The lower relay of the group of relays 44 feeds the other stepping relay 47 and causes the sheet 33 to be moved up slightly. The overall movement of the sheet 33 with respect to the flying spot is carried out by well-known mechanisms which move the sheet from the right to the left while scanning a single line of printed material and which will, after the first line is read, return the sheet to the furthest right position with respect to the flying spot and at the same time move the sheet up on line.

The electrical operation of the comparator circuit is exactly analogous to that of the system of Figure 4. The recognition circuit 40 is that of Figure 5 and its operation has been explained before. When a coincidence occurs between the character on the page 33 and the character on the disk 36, the condenser 24 discharges and the selector circuit operates the relays as described above. It should be pointed out that because the motion of the flying spot has no specific relation to the character being being scanned, the character is converted to a series of pulses as the spot travels back and forth across the character. The motion may be similar to the scanning motion of the electron beam in a television picture tube.

It will be apparent that the embodiments shown are only exemplary and that various modifications in construction and arrangement can be made within the scope of my invention as defined in the appended claims.

I claim:

1. In an optical scanning system for exploring indications on an identification mask and an information carrier to determine the coincidence of discrete indications on said identification mask and information carrier, the improvement comprising a moving spot of light which sequentially illuminates each of said discrete indications on the identification mask and information carrier, a photosensitive means positioned to receive any light from said moving spot which is uninterrupted by said identification mask and information carrier and means for comparing the light impinging upon said photosensitive means as the moving spot passes over said indications with a known quantity of light.

2. An optical matching system for comparing information carried on two record elements, comprising a first record element carrying a first set of discrete data indications, a second record element carrying a second set of discrete data indications, a photosensitive means, scanning means for directing light on each of said record data indications in succession, said scanning means and said photosensitive means being positioned with respect to said record elements so that light is prevented from impinging upon said photo sensitive means when there is coincidence between the data indications of said record elements and so that light will impinge upon said photosensitive means when there is a lack of coincidence between the indications on said record elements, and comparator means for comparing the light which impinges upon said photosensitive means as said light passes over said discrete data indications of said record element with a quantity of light which indicates a lack of coincidence between data indications on said record elements.

3. An optical coincidence device comprising at least one first means for carrying optical data in the form of elementary units of information, at least one second means for carrying optical data, also in the form of elementary units of information, light scanning means which scans all of said data by directing light on only a small portion of said optical data of both of said data-carrying means at any one time, photosensitive means positioned so that the said light impinges upon it when substantially uninterrupted by at least one of said data-carrying means, and a comparator means cooperatively arranged with said photosensitive means to detect coincidence between a group of said elementary units of information on said first means and a group of said elementary units of information on said second means.

4. The invention according to claim 3 in which the optical data on said second means is the negative image of the optical data on said first means.

5. The invention according to claim 4 in which said first means is a transparent medium having opaque optical data and said second means is an opaque medium having transparent optical data.

6. The invention according to claim 4 in which said first means is made of a sheet of material which will reflect light and the optical data is recorded on said sheet in the form of nonreflecting indications and said second means is an opaque rotating disk having transparent optical data thereon.

7. The invention according to claim 6 in which each piece of said optical data on said rotating disk is composed of a group of three identical units, each group of three being positioned along a helix, and means for changing the position of said sheet with respect to said disk when said light strikes the first unit of the group of three and also when said light strikes the third unit of the group of three.

8. In an optical identification system for identifying indications on an information carrier, means to compare optically discrete identifying indications on said information carrier with discrete indications on an identification mask, said means including the improvement comprising a moving spot of light which sequentially illuminates each of said discrete information indications on said carrier at an instant.

9. In an optical identification system in which light sensitive means are used to determine the identicalness of discrete identifying optical indications on an information carrier and on an identification mask, the improvement comprising sequentially illuminating each of said discrete information indications on said carrier at a given time and comparing the amount of light reaching the light sensitive means with a known quantity of light.

10. In an optical identification system in which light sensitive means are used to determine the identicalness of discrete identifying optical indications on an information carrier and on an identification mask, the improvement comprising illuminating each of said information carrier indications in succession until all of the information carrier has been illuminated and continuously comparing the light reaching the light-sensitive means with a known quantity of light.

11. The invention according to claim 10, further comprising indicating a lack of identicalness when the amount of light reaching the light-sensitive means at any time during the period required to illuminate all of the information carrier is as great as the known quantity of light.

12. In an optical identification system in which light-sensitive means are used to determine the identicalness of discrete identifying optical indications on an information carrier and on an identification mask, the improvement comprising means for illuminating each of said information carrier indications in succession until all of said information carrier has been illuminated and means for continuously comparing the light reaching said light-sensitive means with a known quantity of light.

13. In an optical identification system in which light-sensitive means are used to determine the identicalness of discrete identifying optical indications on an information carrier and on an identification mask, the improvement comprising means for directing a first quantity of light onto said light-sensitive means during first interval, means for illuminating each of said information carrier indications in succession until all of said information carrier has been illuminated during a second interval, and means for determining if the quantity of light reaching said light-sensitive means at any instant during the second interval is at least as great as the light reaching said light-sensitive means during said first interval.

14. An optical matching system for comparing information carried on two record elements, comprising a first record element carrying a first set of discrete data indications, a second record element carrying a second set of discrete data indications, a photosensitive means for converting light energy into electrical energy, scanning means for directing light on each of said record indications in succession, said scanning means and said photosensitive means being positioned with respect to said record elements so that light is prevented from impinging upon said photosensitive means when there is coincidence between the data indications on said record elements and so that light will impinge upon said photosensitive means when there is a lack of coincidence between the indications on said record elements, comparator means for comparing the voltage output from said photosensitive means produced by the light which impinges upon said photosensitive means as said light passes over said discrete indications of said record element with a voltage which is produced by a quantity of light which indicates a lack of coincidence between data indications on said record elements.

References Cited in the file of this patent

UNITED STATES PATENTS

| | | |
|---|---|---|
| 1,915,993 | Handel | June 27, 1933 |
| 2,370,160 | Hansell | Feb. 27, 1945 |
| 2,402,058 | Loughren | June 11, 1946 |
| 2,580,270 | Badgley et al. | Dec. 25, 1951 |
| 2,594,358 | Shaw | Apr. 29, 1952 |